(12) United States Patent  
Rodriguez

(10) Patent No.: US 8,572,829 B1  
(45) Date of Patent: Nov. 5, 2013

(54) HINGE REPLACEMENT SYSTEM AND METHOD

(76) Inventor: Andrew Rodriguez, Fort Lauderdale, FL (US)

(*) Notice: Subject to any disclaimer, the term of this patent is extended or adjusted under 35 U.S.C. 154(b) by 0 days.

(21) Appl. No.: 13/455,197

(22) Filed: Apr. 25, 2012

(51) Int. Cl.  
*B23P 6/00* (2006.01)

(52) U.S. Cl.  
USPC ............ 29/402.06; 29/11; 29/402.12; 16/390

(58) Field of Classification Search  
USPC ......... 29/11, 402.06, 402.09, 402.11, 402.12, 29/402.19  
See application file for complete search history.

(56) References Cited

U.S. PATENT DOCUMENTS 1,692,032 A * 11/1928 Geske ............................. 29/11  
7,296,839 B2 * 11/2007 Scheerhorn ................. 296/37.8

FOREIGN PATENT DOCUMENTS

WO    WO 2011146887 A1 * 11/2011

OTHER PUBLICATIONS

Joel Webb, Yet another Miata Center Console Hinge Fix, Oct. 11, 2009 http://www.miata.net/garage/cchinge/.*  
Brian P, How to: Fix a Broken Armrest '95-97 Cutlass '95-96 Regal, '94-96 GP, Jul. 18, 2006 http://www.w-body.com/showthread.php/24155-How-To-Fix-a-Broken-Armrest-95-97-Cutlass-95-96-Regal-94-96-GP.*

* cited by examiner

*Primary Examiner* — David Bryant  
*Assistant Examiner* — Ruth G Hidalgo-Hernandez  
(74) *Attorney, Agent, or Firm* — Gold & Rizvi, P.A.; Glenn E. Gold

(57) ABSTRACT

An apparatus and respective method for replacing a damaged center console hinge system. Initially, a portion of each of the original hinges is removed, leaving a portion of each base to form a respective registration section. A first hinge replacement member is placed over the first registration OEM hinge section. The first replacement hinge pin is inserted into a hinge receptacle of the OEM armrest cover. A pin of a second replacement hinge member is subsequently inserted into the opposing hinge hole in the OEM armrest cover and the replacement member is placed over the second registration OEM hinge section. Threaded fasteners, adhesive, or any other mechanical fastener are then used to secure the replacement hinge assembly to the center console.

20 Claims, 14 Drawing Sheets

HINGE REPLACEMENT SYSTEM AND METHOD

FIELD OF THE INVENTION

The present disclosure generally relates to a method for repairing a hinge system. More particularly, the present disclosure relates to a low-cost replacement hinge system for a hinged center console of a vehicle.

BACKGROUND OF THE INVENTION

The present invention provides a method to replace a broken or damaged hinge system for a center console of an automobile.

An automobile's center console may contain an armrest located between the driver and the front passenger. The armrest usually comprises of a compartment covered by a hinged or slideable cover providing a storage compartment for retention of small object and other personal items. In a hinged configuration, the hinges are typically formed including a hinge pin that is inserted into a hinge receptacle in a receiving member. Two hinge pins are generally affixed, or formed integrally, with the center console and positioned such that the hinge pins align with their respective hinge holes located within a lower surface of the lid. This allows the lid to rotate between an open position and closed position. In an open position, the occupants can insert and/or retrieve items from the compartment. In the closed position, the occupants can use the lid-covered portion of the center console as an armrest or other supporting surface. The closed position also provides a certain aesthetic appeal. Hinges retaining the center console cover are known to break. When the hinge breaks, the cover becomes inoperable, thus the cover is no longer retained in a closed configuration. This can allow items stored within the armrest compartment to shift and become displaced from the compartment, moving freely about the vehicle cabin. This is exasperated in the event of an accident or collision, where the stored items may become projectiles, creating a safety hazard. Furthermore, the lid no longer provides a stable surface to the occupants in the closed position.

What is desired is a low cost replacement hinge system that can be quickly and easily installed with minimal tools and experience. The replacement hinge system should withstand at least forces applied in normal use of an automobile center console.

SUMMARY OF THE INVENTION

The basic inventive concept provides a method for replacing a portion of a broken or detective hinge, and more specifically design for repair of a center console hinge.

A first aspect of the present invention provides a method for replacing a broken original equipment manufacturer (OEM) hinge system comprising:

removing an original equipment manufacturer armrest cover from an original equipment manufacturer hinge system having a damaged hinge interface;

machining off a portion of a first original equipment manufacturer hinge base section leaving a first registration OEM hinge section;

machining off a portion of a second original equipment manufacturer hinge base section leaving a second registration OEM hinge section;

placing a first replacement hinge base section over the first registration OEM hinge section;

placing a hinge pin located on the second replacement hinge base section into a second hinge receptacle disposed upon a lower surface of the OEM armrest cover;

rotating the second replacement hinge base section and original equipment manufacturer armrest cover so as to place a hinge pin located on the first replacement hinge section into a first hinge receptacle disposed upon an opposing lower surface of the OEM armrest cover;

rotating the second replacement hinge base section and original equipment manufacturer armrest cover so as to bring the second registration OEM section into the second registration receptacle and the alignment feature into the alignment feature receptacle, while maintaining the hinge pin located on the first replacement hinge base section in the first hinge receptacle; and securing the first and second replacement hinge base sections to a center console base member by threading a plurality of threaded fasteners through a plurality of fastener apertures located in the first and second replacement hinge base sections and further threading said threaded fasteners into the center console base member.

In another aspect, the first replacement hinge member is secured to the center console base member before placing the hinge pin located on the second replacement hinge base section into the first hinge receptacle.

In another aspect of the invention, the first replacement hinge member is secured with a threaded fastener.

In yet another aspect of the present invention, the first replacement member is secured with A second aspect of the present invention provides for a replacement hinge system comprising:

a first replacement hinge member; and a second replacement hinge member.

In another aspect of the invention, the first replacement hinge member is formed to be substantially the same shape as a first original equipment manufacturer hinge and the second replacement hinge member is formed to be substantially the same shape as the second original equipment manufacturer hinge base section.

In another aspect of the invention, the first replacement hinge member has a first registration receptacle formed in it, wherein the registration receptacle is shaped to be complimentary to a first registration original equipment manufacturer hinge section formed by machining off a section of the first original equipment manufacturer hinge base member.

In another aspect of the invention, the first replacement hinge has a first replacement hinge base comprising a first plurality of fastener apertures.

In a further aspect, the first replacement hinge has a first member attachment aperture.

In a further aspect of the invention, an alignment feature is located on the first replacement hinge base.

In yet another aspect, the second replacement hinge member has a second plurality of fastener apertures arranged in a similar pattern as the first plurality of fastener apertures.

In yet another aspect, a second registration receptacle is formed in the second replacement hinge member to be of complimentary shape to the second registration original equipment manufacturer hinge section.

In yet another aspect of the invention, a further recess is formed in the second replacement hinge member to be of complimentary shape to the alignment feature located such that when the alignment feature is fit into the alignment receptacle, the first plurality of fastener apertures align with the second plurality of fastener apertures.

These and other advantages of the invention will be further understood and appreciated by those skilled in the art by reference to the following written specification, claims and appended drawings.

BRIEF DESCRIPTION OF THE DRAWINGS

The invention will now be described, by way of example, with reference to the accompanying drawings, in which.

Like reference numerals refer to like parts throughout the various views of the drawings.

DETAILED DESCRIPTION OF THE INVENTION

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper", "lower", "left", "rear", "right", "front", "vertical", "horizontal", and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 1:
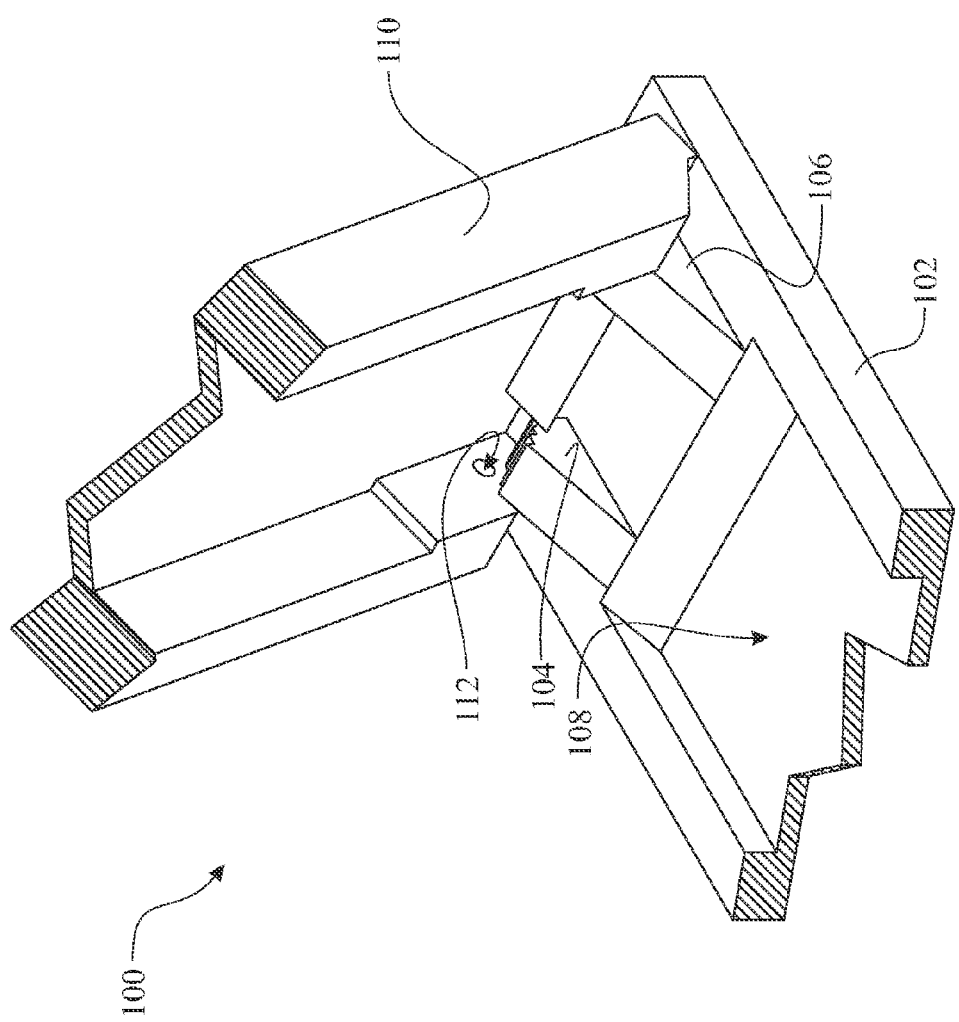
FIG. 1 presents an isometric view of an exemplary center console having a hinged cover, wherein the illustration exhibits a damaged hinge interface.
Figure 2:
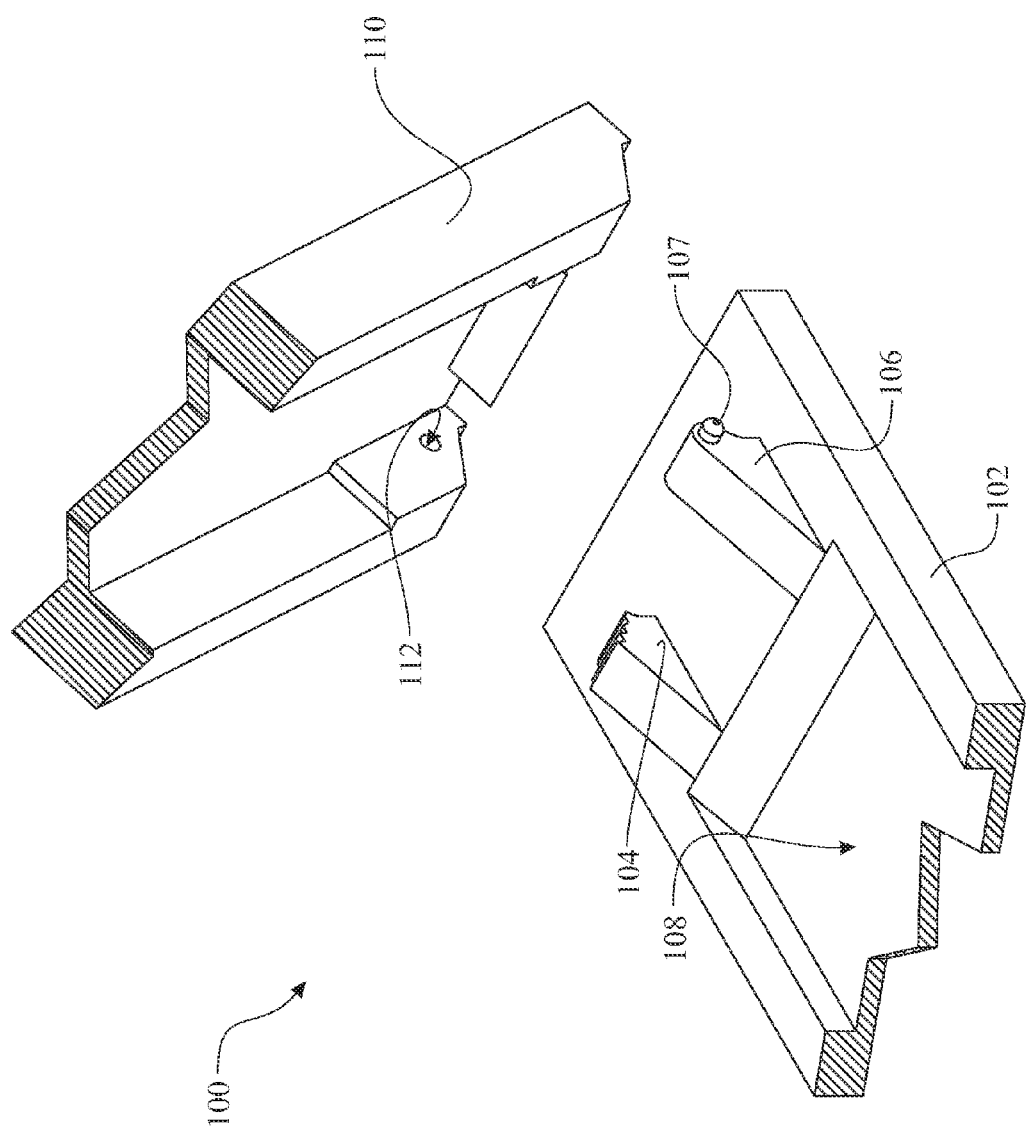
FIG. 2 presents an isometric view of the center console cover being separated from the broken hinge assembly.
Figure 3:
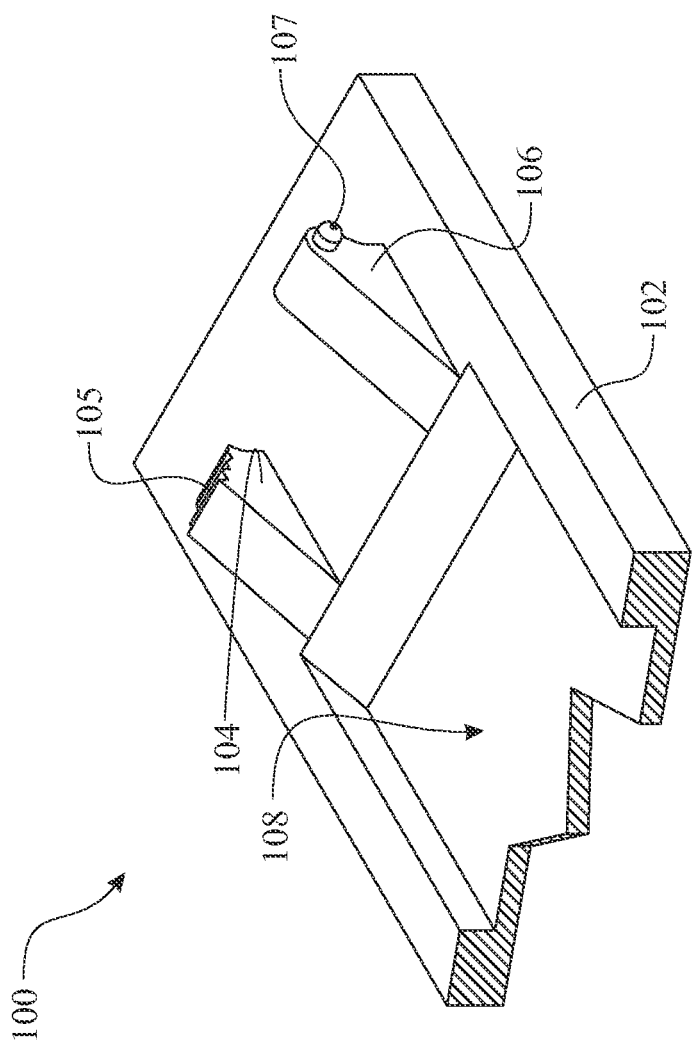
FIG. 3 presents an isometric view of the broken hinge assembly of the center console.
Figure 4:
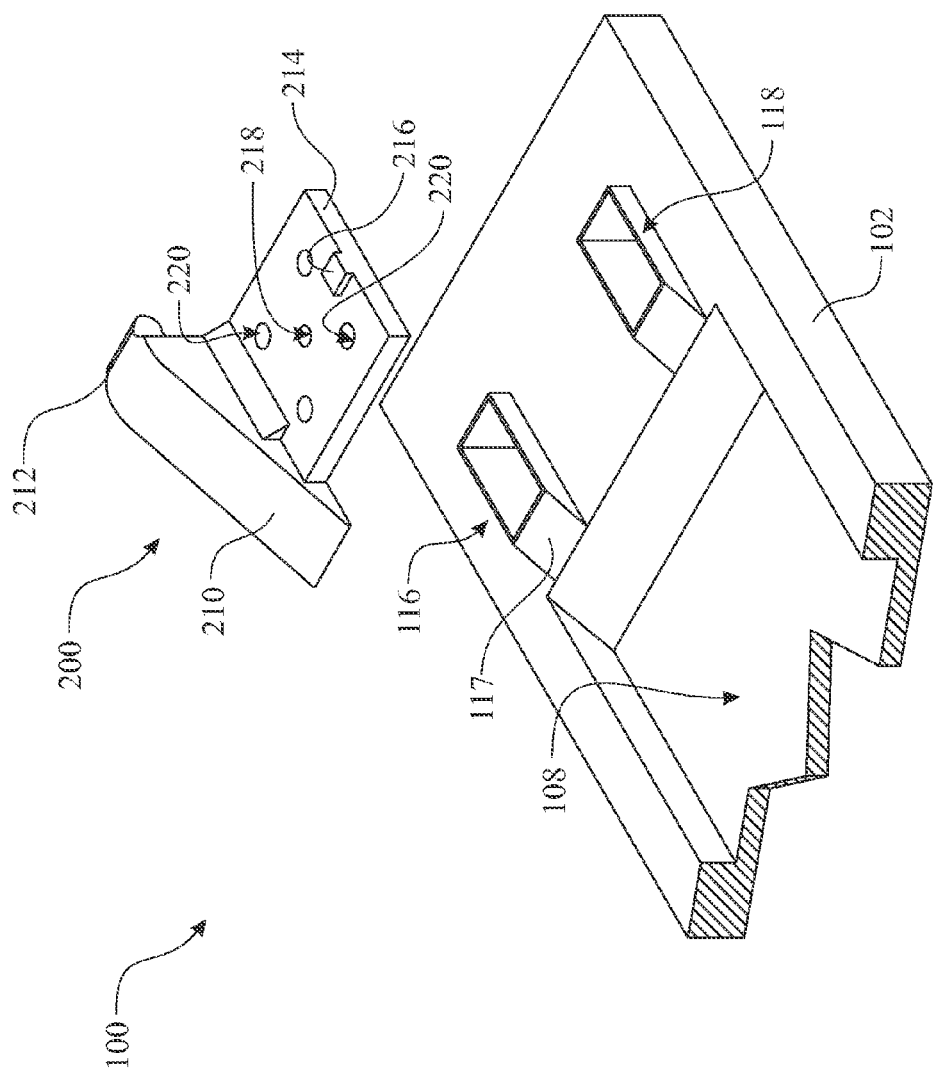
FIG. 4 presents an isometric view of the center console, where the original damaged hinge assembly has been removed and machined forming a registration original equipment manufacturer hinge sections to receive a first and second replacement hinge sections.
Figure 5:
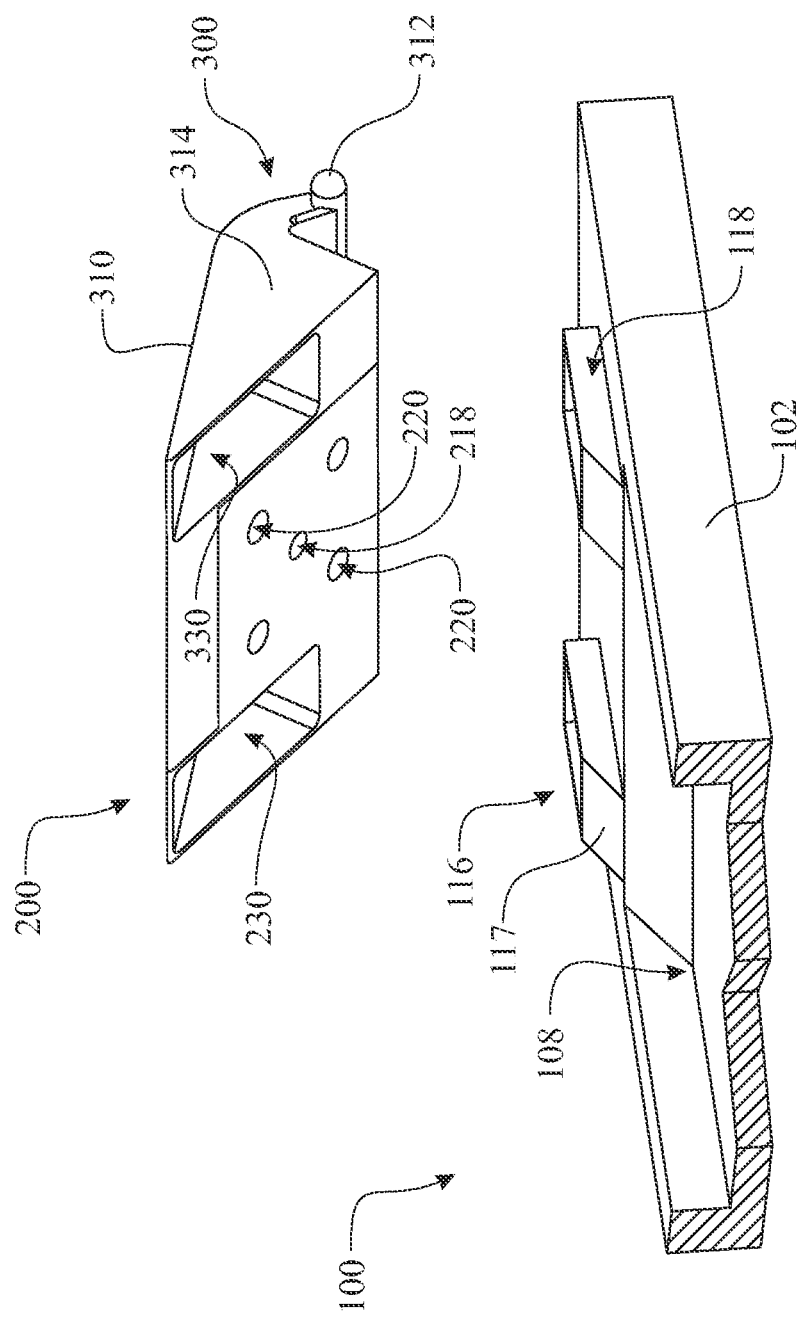
FIG. 5 presents an isometric view of the center console and the first replacement hinge section, detailing registration features of each element.
Figure 6:
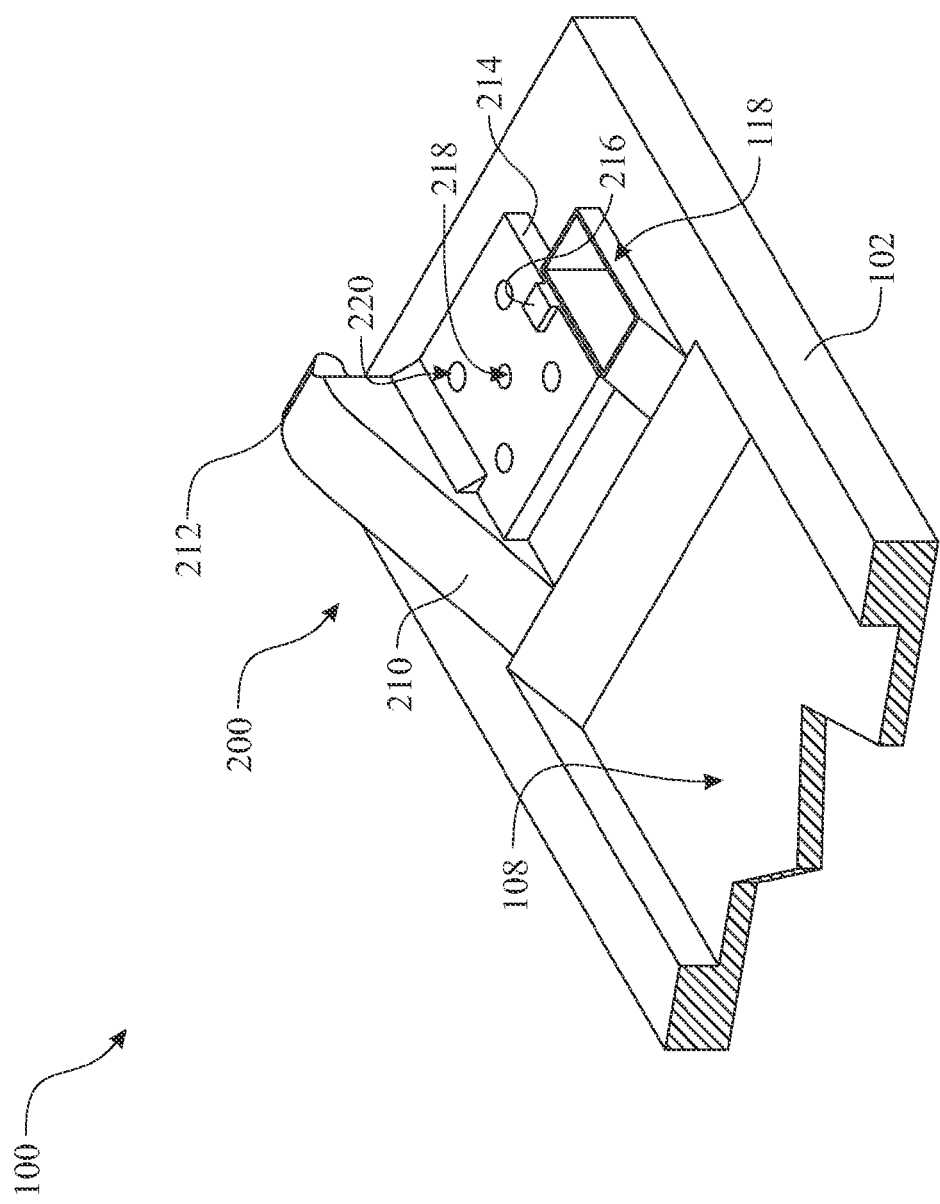
FIG. 6 presents the first replacement hinge section assembled over the first registration original equipment manufacturer hinge section.
Figure 7:
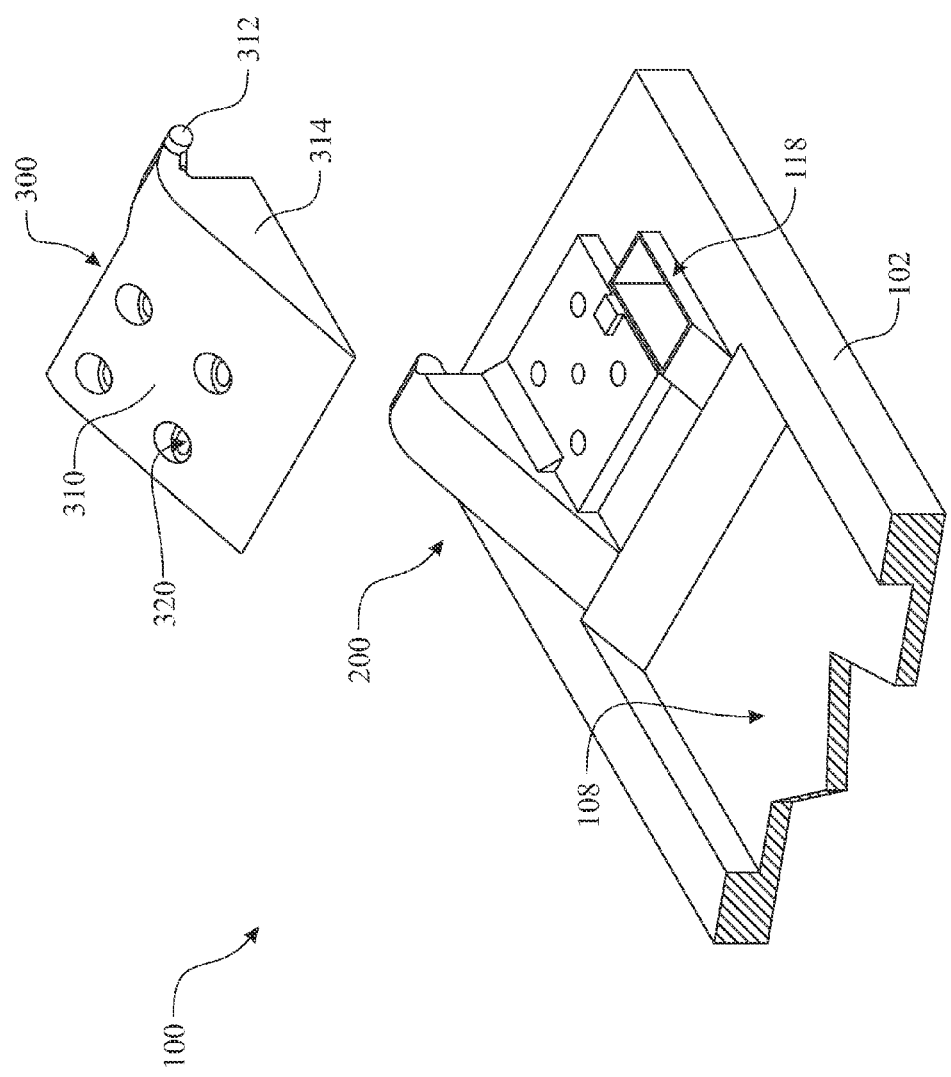
FIG. 7 presents an isometric view detailing the position of a second replacement hinge member in relation to the first replacement hinge section.

A broken original equipment manufacturer hinge system 100 is illustrated in FIGS. 1 through 3. Hereinafter, "original equipment manufacturer" will be abbreviated and referred to as "OEM". As shown in FIG. 1, an OEM hinge system 100 consists of a center console base member 102, an OEM armrest cover 110, a first OEM hinge base section 104 and a second OEM hinge base section 106. Generally, the first OEM hinge base section 104 and second OEM hinge base section 106 are formed in an integral manner with the center console base member 102. Both the first OEM hinge base section 104 and second OEM hinge base section 106 include an OEM hinge pin 107 which fits into a respective OEM hinge receptacle 112 located on the OEM armrest cover 110.

The hinge can be damaged in any of a number of ways. As may be more apparent in FIG. 3, a damaged first OEM hinge base region 105 of the first OEM hinge base section 104 is missing one of the OEM hinge pins 107. For exemplary purposes, the damaged first OEM hinge base region 105 is shown to have a missing OEM hinge pin 107, however it can be contemplated that either the second OEM hinge base section 106 or both the first OEM hinge base section 104 and second OEM hinge base section 106 may be missing the OEM hinge pin 107 due to damage, or otherwise. The absence of the OEM hinge pin 107 on the damaged first OEM hinge base region 105 creates instability in the OEM hinge system 100 of the OEM armrest cover 110. This may cause the OEM armrest cover 110 to align improperly on closing, or separate from the remaining OEM hinge pin 107.

A replacement hinge system 500 can be used to repair the damaged OEM hinge configuration and restore the stability previously lost due to the damaged or missing OEM hinge pin 107. The replacement hinge system 500 comprises two distinct components: a first replacement hinge member 200 and a second replacement hinge member 300. The first replacement hinge member 200 and second replacement hinge member 300 are assembled between the OEM armrest cover 110 and the center console base member 102 to repair the broken hinge assembly.

The steps or repairing an OEM hinge assembly having a missing OEM hinge pin 107 are illustrated in FIGS. 4 through 12. The repair person obtains a hinge repair kit comprising a first replacement hinge member 200, second replacement hinge member 300, and a plurality of threaded fasteners 400. Prior to assembling a first replacement hinge member 200 and a second replacement hinge member 300 to the center console base member 102, the repair person removes an upper portion of the first OEM hinge base section 104 and second OEM hinge base section 106 forming a first registration OEM hinge section 116 and second registration OEM section 118, respectively. The removal process can be accomplished using any reasonable method known by those skilled in the art, including a cutting process, a grinding process, a milling process, an abrading process, and the like.

The first replacement hinge member 200 is preferably fabricated of a unitary construction comprising a first replacement hinge base 214 and a first replacement hinge pin 212. The first replacement hinge pin 212 is formed as a feature of the first replacement hinge member 200, wherein the first replacement hinge pin 212 is of a complimentary size and shape to the first OEM hinge receptacle 112 located in the OEM armrest cover 110. The first replacement hinge member 200 preferably has a shape that is substantially similar to the first OEM hinge base section 104 and is dimensioned such that the first replacement hinge front face 210 is parallel to the remainder of first original hinge face 117. A first registration receptacle 230 is formed within a lower portion of the first replacement hinge member 200, wherein the first registration receptacle 230 is sized and shaped to receive the first registration OEM hinge section 116. A plurality of first replacement hinge fastener apertures 220 are provided through the first replacement hinge base 214. An optional first member attachment aperture 218 may also be provided through the first replacement hinge base 214 to aid in the assembly process. An optional alignment feature 216 may be integrated into the first replacement hinge base 214 to aid in registration between the first replacement hinge base 214 and a second replacement hinge base 314 of the second replacement hinge member 300. For exemplary purposes, the alignment feature 216 is depicted as a raised square, however other shapes may be contemplated. The first replacement hinge base 214 preferably extends between the first registration OEM hinge section 116 and the second registration OEM section 118. The first replacement hinge base 214 is designed having a length and height dimensioned to provide proper mechanical support to endure normal use of the replacement hinge system 500. The first replacement hinge pin 212 is positioned and oriented upon the first replacement hinge member 200 such that when the first replacement hinge member 200 is properly positioned over the first registration OEM hinge section 116, the first replacement hinge pin 212 aligns with location of the original OEM hinge pin 107. The first replacement hinge member 200 can be retained in position by inserting a mechanical fastener 400, such as a threaded screw or bolt, through the first member attachment aperture 218 and securing the mechanical fastener 400 into the center console base member 102.

Assembly of the second replacement hinge member 300 is illustrated in FIGS. 7-12. Similar to the first replacement hinge member 200, the second replacement hinge member 300 is preferably fabricated of a unitary construction comprising a second replacement hinge base 314 and a second replacement hinge pin 312. The second replacement hinge base 314 has an exterior surface that is sized and shaped to extend to the first replacement hinge member 200 providing a unitary appearance when assembled to the center console base member 102. The second replacement hinge member 300 is preferably designed having a second replacement hinge face 310 that is parallel to the first replacement hinge front face 210. The second replacement hinge pin 312 is formed as a feature of the second replacement hinge member 300, wherein the second replacement hinge pin 312 is of a complimentary size and shape to the remaining OEM hinge receptacle 112 located in the OEM armrest cover 110. The second replacement hinge member 300 preferably has a shape that is substantially similar to the second OEM hinge base section 106 and is dimensioned such that the second replacement hinge front face 310 is parallel to the remainder of second original hinge face 118. A second registration receptacle 330 is formed within a lower portion of the second replacement hinge member 300, wherein the second registration receptacle 330 is sized and shaped to receive the second registration OEM hinge section 118. A plurality of second replacement hinge fastener apertures 320 are provided through the second replacement hinge base 314. Each second replacement hinge fastener aperture 320 is arranged to align with a respective first replacement hinge fastener aperture 220.

A second registration receptacle 330 is formed within a lower portion of the second replacement hinge member 300, wherein the second registration receptacle 330 is sized and shaped to receive the second registration OEM hinge section 118. Each of the second replacement hinge fastener apertures 320 include a countersink so that the when a threaded fastener 400 is inserted into each respective second replacement hinge fastener aperture 320, the head of the threaded fastener 400 is recessed and concealed within the countersink after assembly thereof. It is understood that the design of the first replacement hinge member 200 and the second replacement hinge member 300 may enable assembly thereof by inserting the threaded fastener 400 through one of the two members 200, 300, wherein the design of the two members 200, 300 provides a feature to secure the opposite member in position.

The second replacement hinge member 300 can optionally include a mating alignment feature 316, which is complimentary to and designed to engage with the alignment feature 216. This ensures proper alignment between the first replacement hinge member 200 and the second replacement hinge member 300.

Both the first replacement hinge member 200 and the second replacement hinge member 300 may be manufactured of plastic, a polymer, metal, or any other material capable of withstanding forces applied in normal use and compatible with the center console base member 102 and the OEM armrest cover 110.

Figure 13:
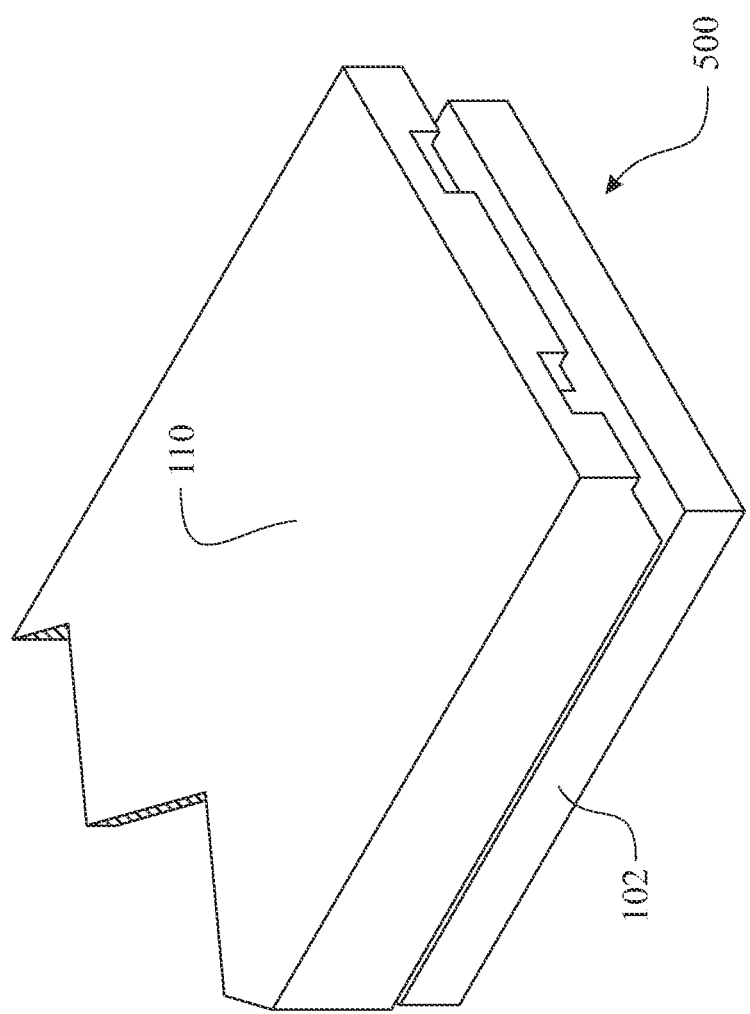
FIG. 13 presents an isometric rear view of the repaired hinge system illustrating the OEM armrest cover in the closed configuration.
Figure 14:
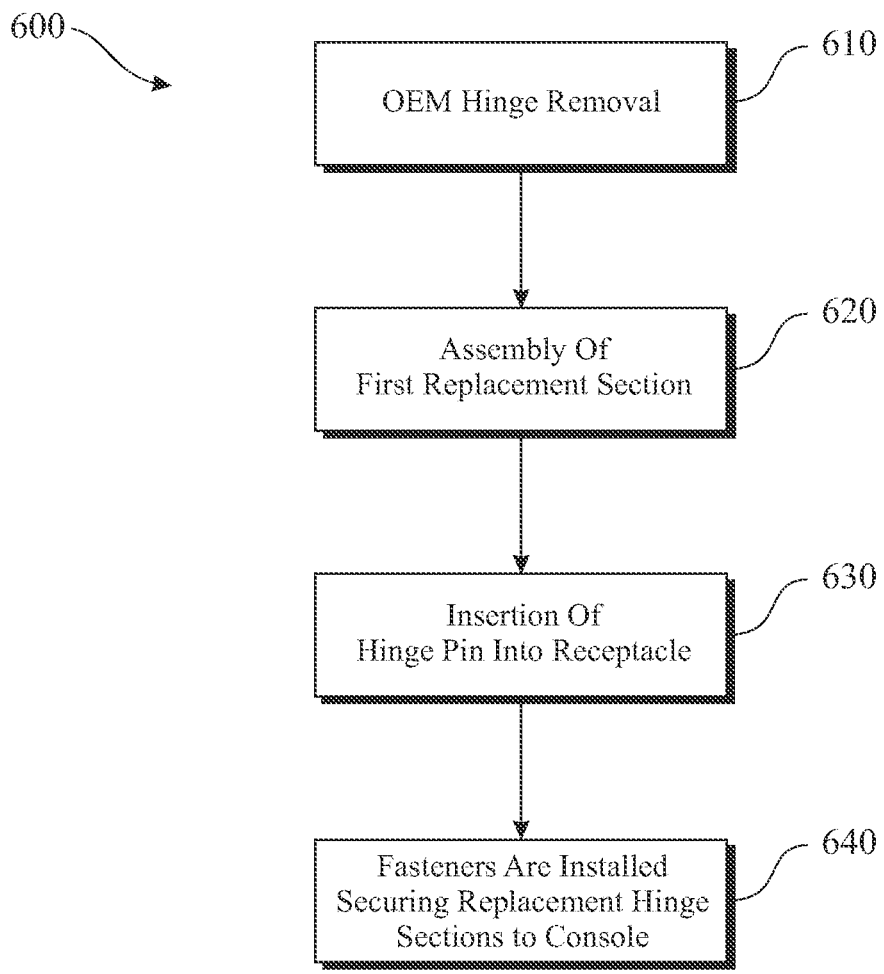
FIG. 14 presents an exemplary process flow diagram for installation of a replacement hinge system.

An exemplary hinge replacement flow diagram representing a hinge replacement method 600 is presented in FIG. 13. In an OEM hinge removal step 610, non-useable portions of the first OEM hinge base section 104 and second OEM hinge base section 106 are machined off, leaving a first registration OEM hinge section 116 and a second registration OEM section 118. The first OEM hinge base section 104 and second OEM hinge base section 106 can be removed using any machining process, including cutting, milling, grinding, abrading, and the like. The first registration OEM hinge section 116 and second registration. OEM section 118 will serve as location and registration features for the first replacement hinge member 200 and second replacement hinge member 300.

In a first replacement hinge section assembly step 620, the first replacement hinge member 200 is placed over the first registration OEM hinge section 116. The first registration receptacle 230 ensures that the first replacement hinge pin 212 is located in the proper position when the first registration receptacle 230 is engaged with the first registration OEM hinge section 116. Optionally, the first replacement hinge member 200 may be secured to the center console base member 102 by an adhesive or by securing a threaded fastener 400 through the first member attachment aperture 218 and into the center console base member 102.

In an insertion step 630, the first replacement hinge pin 212 is inserted into the first OEM hinge receptacle 112. Due to physical constraints, the OEM armrest cover 110 and second replacement hinge member 300 may have to be rotated to insert the first replacement hinge pin 212 into the first OEM hinge receptacle 112. The OEM armrest cover 110 and the second replacement hinge member 300 are then manipulated such that the second replacement hinge member 300 fits over both the second registration OEM section 118 and the first replacement hinge base 214. While fitting the second registration OEM section 118 into the second registration receptacle 330 serves to roughly align the second replacement hinge member 300 with the first replacement hinge member 200, engaging the optional alignment feature 216 with the mating alignment feature 316 serves to ensure that the plurality of first replacement hinge fastener apertures 220 align with the plurality of second replacement hinge fastener apertures 320 and that the first replacement hinge pin 212 and the second replacement hinge pin 312 are parallel to one another and are properly positioned within the OEM hinge receptacles 112 of the OEM armrest cover 110.

Figure 8:
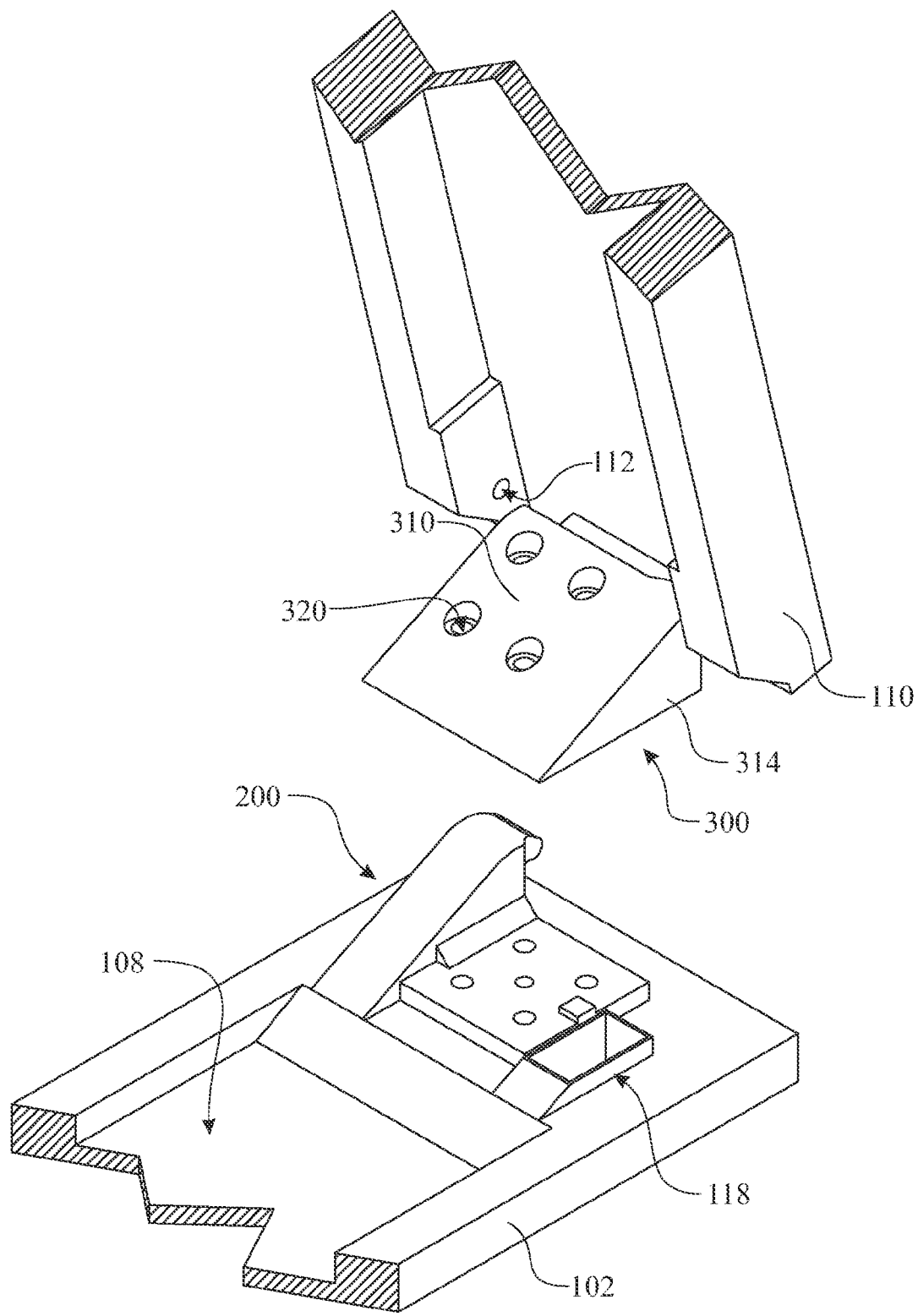
FIG. 8 presents an isometric view demonstrating the alignment of the second replacement hinge member fits into the OEM armrest cover.
Figure 9:
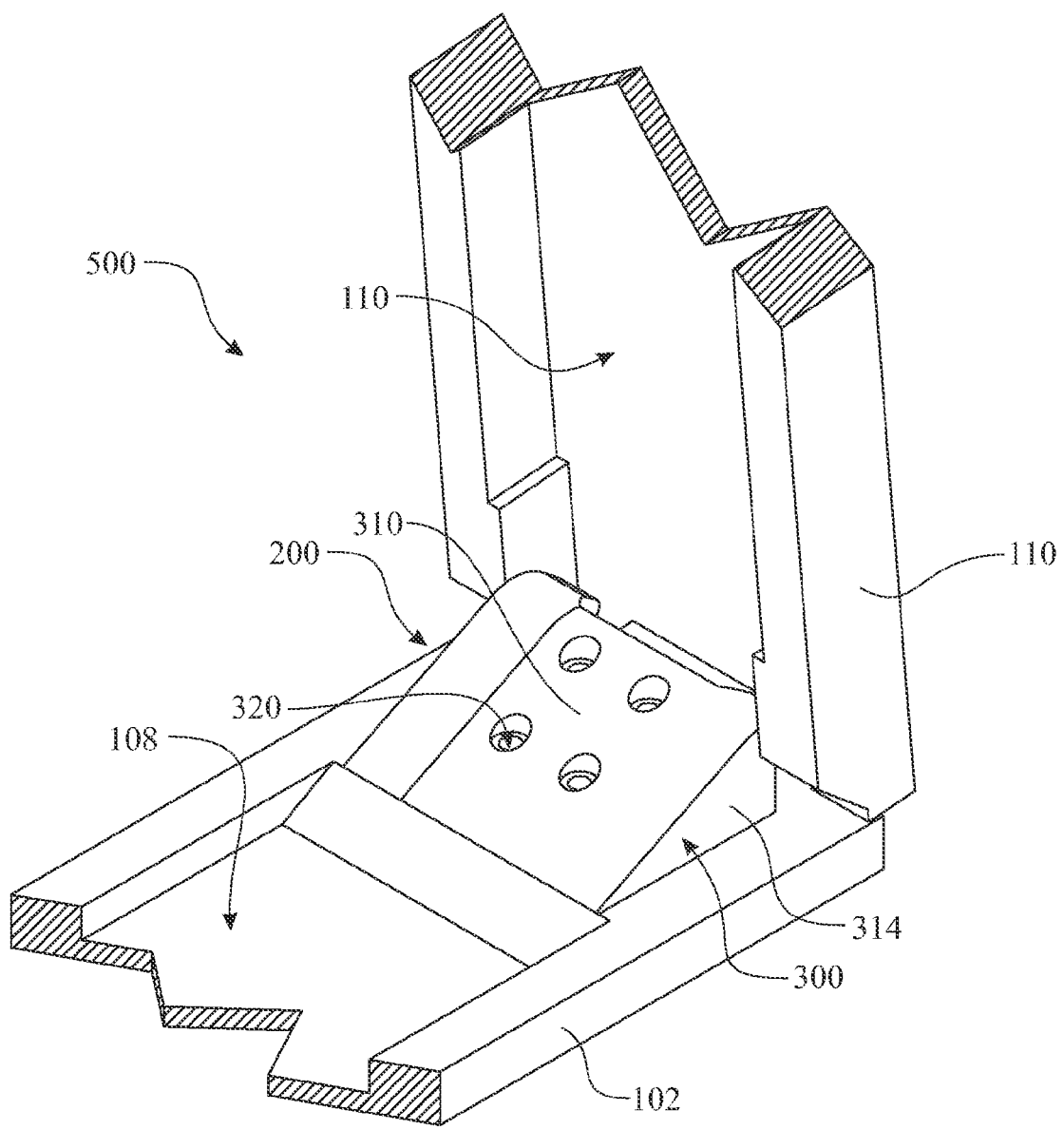
FIG. 9 presents an isometric view demonstrating the assembly of the second replacement hinge member onto the first replacement hinge section and over the second registration original equipment manufacturer hinge section, as well as how the OEM armrest cover engages with the replacement hinge assembly.

As shown in FIG. 8, the replacement hinge system 500 is initially installed while the OEM armrest cover 110 is in an upright position. This enables the installer to easily place the first replacement hinge pin 212 and second replacement hinge pin 312 into the first OEM hinge receptacle 112 and the opposite hinge hole. In addition, by installing the replacement hinge assembly while the OEM armrest cover 110 in the upright position, the installer can ensure that the second replacement hinge member 300 fits into the correct position by using the alignment feature 216 on the first replacement hinge member 200.

Figure 10:
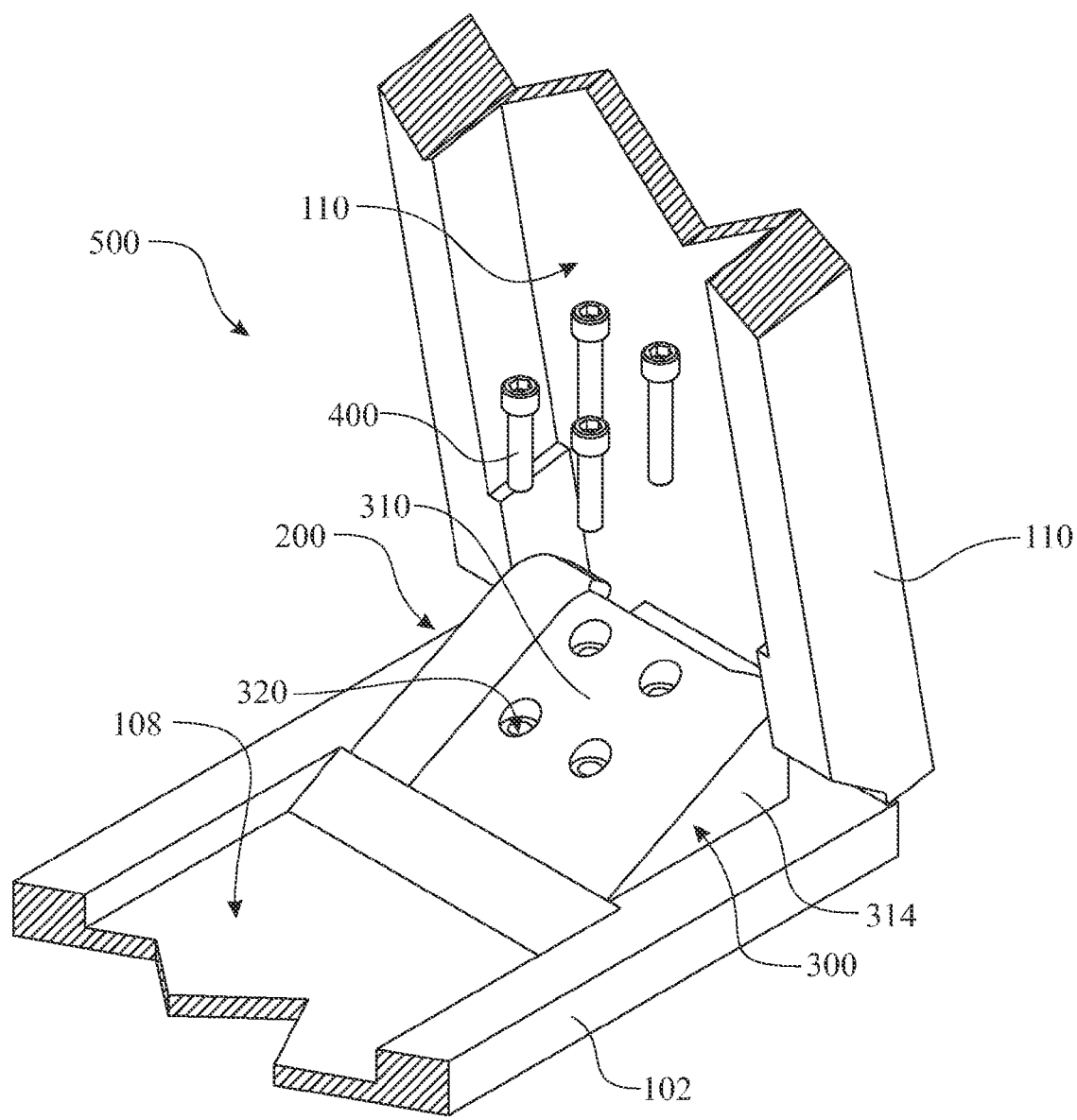
FIG. 10 presents an isometric view introducing a plurality of screws used to fasten the replacement hinge system to the center console.
Figure 11:
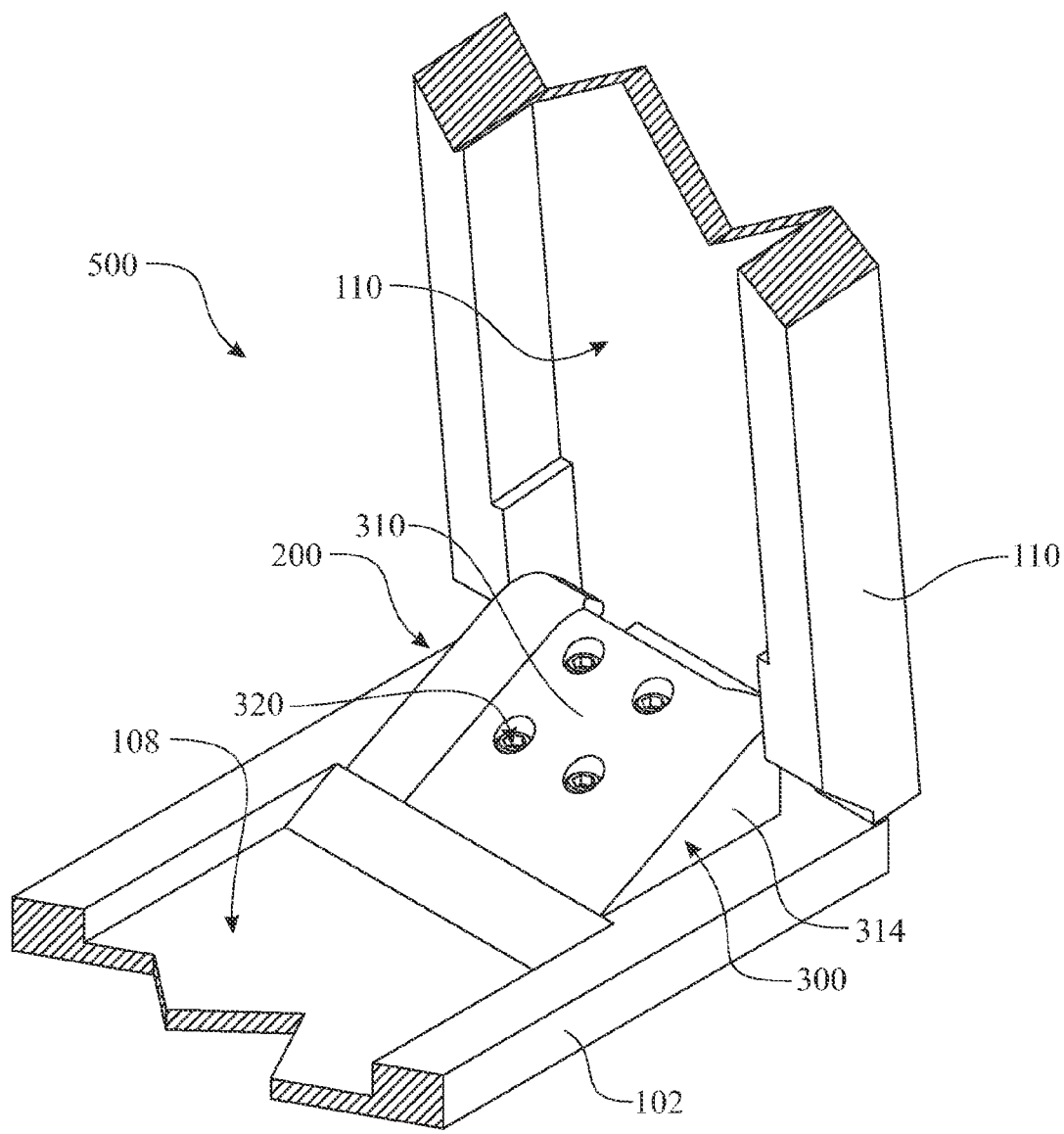
FIG. 11 presents an isometric front view of the repaired hinge system illustrating the OEM armrest cover in the open configuration.

In a securing step 640, the first replacement hinge member 200 and the second replacement hinge member 300 are affixed to the center console base member 102 using a plurality of threaded fasteners 400. Each threaded fastener 400 is placed into the respective second replacement hinge fastener aperture 320. The threaded fastener 400 passes through the second replacement hinge fastener aperture 320, continuing through each respective first replacement hinge fastener aperture 220 and finally tapping into the center console base member 102. The threaded fastener 400 is rotated and tightened into location, thereby securing the second replacement hinge member 300 and first replacement hinge member 200 to center console base member 102. For additional stability, the first replacement hinge member 200 and second replacement hinge member 300 may be fixed using an adhesive, such as epoxy. Alignment of the plurality of threaded fasteners 400 with each second replacement hinge fastener aperture 320 is illustrated in FIG. 10. A fully affixed and assembled replacement hinge system 500 is shown in FIG. 11.

Figure 12:
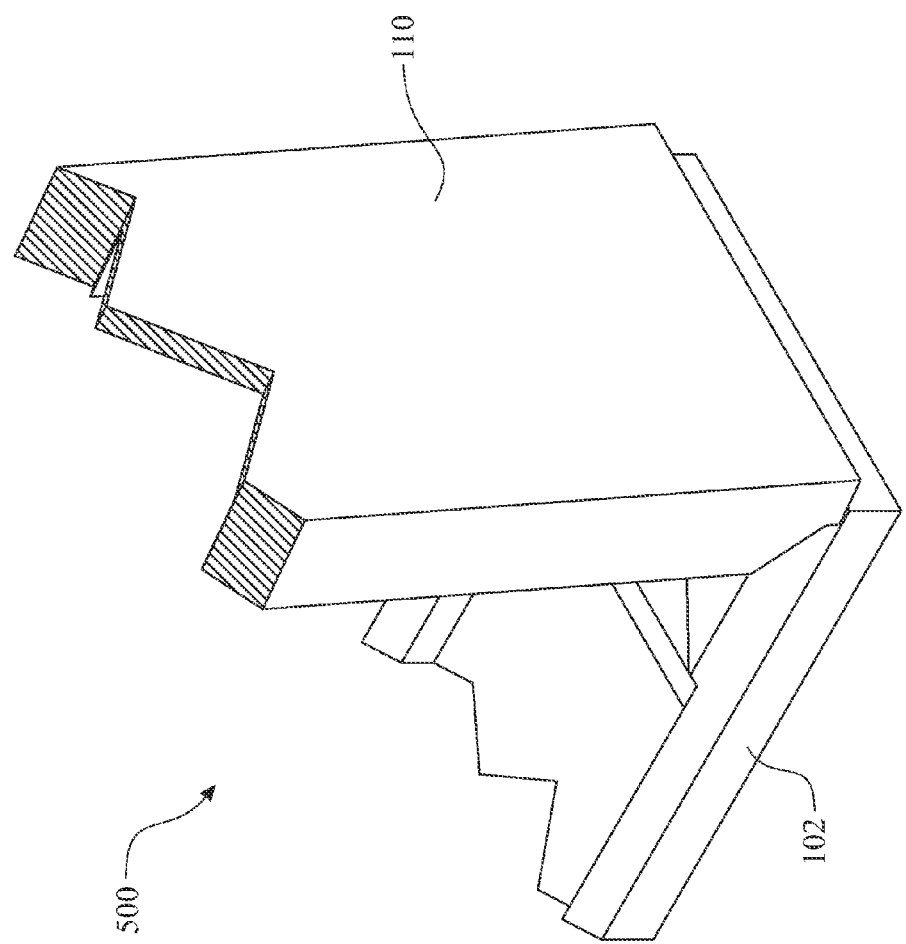
FIG. 12 presents an isometric rear view of the repaired hinge system illustrating the OEM armrest cover in the open configuration.

As can be seen in FIGS. 12 and 13, when the replacement hinge system 500 is properly installed, the OEM armrest cover 110 operated in the same manner as the cover 110 operated when installed with the original OEM hinge base sections 104, 106. Furthermore, when the OEM armrest cover 110 is placed into the closed configuration, the OEM armrest cover 110 will properly align with the center console base member 102 to provide a stable support surface while driving, as well as ensure that all of the contents of the compartment 108 will remain within the compartment 108.

Although the replacement hinge system 500 includes a first replacement hinge member 200 and a second replacement hinge member 300, it is understood that the repair process can be accomplished utilizing a one of the first replacement hinge member 200 and the second replacement hinge member 300 or a single member designed to accomplish the same functionality.

For exemplary purposes, one particular embodiment has been presented in this application, however, it is understood that the aforementioned system and method could be implemented with other systems that incorporate hinges that enable rotating one piece about another.

Since many modifications, variations, and changes in detail can be made to the described preferred embodiments of the invention, it is intended that all matters in the foregoing description and shown in the accompanying drawings be interpreted as illustrative and not in a limiting sense. Thus, the scope of the invention should be determined by the appended claims and their legal equivalence.

What I claim is:

1. A method for replacing a broken hinge for a center console, the method comprising the steps of:
   identifying a damaged hinge assembled between an original equipment manufacturer (OEM) armrest cover and a center console base member;
   separating the original equipment manufacturer (OEM) armrest cover from the center console base member; and
   removing a portion of a damaged OEM hinge base region extending from the center console base member, leaving a registration OEM hinge section;
   obtaining a replacement hinge member, said replacement hinge member comprising a replacement hinge base having a registration receptacle formed as a recess extending inward from a lower surface thereof and a replacement hinge pin extending outward from said replacement hinge base, wherein said replacement hinge pin is sized, shaped, and located to replicate an OEM hinge pin when assembled to the center console base member;
   inserting said replacement hinge pin into an OEM hinge receptacle of said OEM armrest cover;
   placing said replacement hinge member onto said registration OEM hinge section; and
   securing said replacement hinge member to said center console base member.

2. A method for replacing a broken hinge for a center console as recited in claim 1, wherein the step of securing said replacement hinge member to said center console base member further comprises inserting a threaded fastener through said replacement hinge member and into said center console base member.

3. A method for replacing a broken hinge for a center console as recited in claim 2, further comprising a step of concealing a head of said threaded fastener into a countersink located at an exposed end of a fastener aperture.

4. A method for replacing a broken hinge for a center console as recited in claim 1, wherein the registration receptacle is shaped to contour to at least a portion of said registration OEM hinge section; and
   said step of placing said replacement hinge member onto said registration OEM hinge section further locates each said replacement hinge pin at an original hinge pin location.

5. A method for replacing a broken hinge for a center console as recited in claim 1, wherein the step of removing a portion of a damaged OEM hinge base region extending from the center console base member is accomplished using at least one of the following processes:
   a) cutting,
   b) milling,
   c) abrading, and
   d) grinding.

6. A method for replacing a broken hinge for a center console, the method comprising the steps of:
   identifying a damaged hinge assembled between an original equipment manufacturer (OEM) armrest cover and a center console base member;

separating the original equipment manufacturer (OEM) armrest cover from the center console base member; and removing a portion of a damaged OEM hinge base region extending from the center console base member, leaving a first registration OEM hinge section;

removing a portion of a second OEM hinge base region extending from the center console base member, leaving a second registration OEM hinge section;

obtaining a replacement hinge kit, the replacement hinge kit comprising a first replacement hinge member and a second replacement hinge member, each replacement hinge member comprising a replacement hinge base having a registration receptacle formed as a recess extending inward from a lower surface thereof and a replacement hinge pin extending outward from said replacement hinge base, wherein said replacement hinge pin is sized, shaped, and located to replicate a respective OEM hinge pin when assembled to the center console base member;

inserting each said replacement hinge pin into a respective OEM hinge receptacle of said OEM armrest cover;

placing said first replacement hinge member onto said first registration OEM hinge section; and placing said second replacement hinge member onto said second registration OEM hinge section; and securing each said replacement hinge member to said center console base member.

7. A method for replacing a broken hinge for a center console as recited in claim 6, wherein the step of securing said replacement hinge members to said center console base member further comprises inserting a threaded fastener through at least one said replacement hinge member and into said center console base member.

8. A method for replacing a broken hinge for a center console as recited in claim 7, further comprising a step of concealing a head of said threaded fastener into a countersink located at an exposed end of a fastener aperture.

9. A method for replacing a broken hinge for a center console as recited in claim 6, wherein the step of securing said replacement hinge members to said center console base member further comprises inserting a threaded fastener through both replacement hinge members and into said center console base member.

10. A method for replacing a broken hinge for a center console as recited in claim 9, further comprising a step of concealing a head of said threaded fastener into a countersink located at an exposed end of a fastener aperture.

11. A method for replacing a broken hinge for a center console as recited in claim 6, wherein each registration receptacle is shaped to contour to at least a portion of each respective registration OEM hinge section; and said step of placing each said replacement hinge member onto each respective said registration OEM hinge section further locates each said replacement hinge pin at an original hinge pin location.

12. A method for replacing a broken hinge for a center console as recited in claim 6, wherein the step of removing a portion of a damaged OEM hinge base region extending from the center console base member is accomplished using at least one of the following processes:
 a) cutting,
 b) milling,
 c) abrading, and
 d) grinding.

13. A method for replacing a broken hinge for a center console, the method comprising the steps of:

identifying a damaged hinge assembled between an original equipment manufacturer (OEM) armrest cover and a center console base member;

separating the original equipment manufacturer (OEM) armrest cover from the center console base member; and removing a portion of a damaged OEM hinge base region extending from the center console base member, leaving a first registration GEM hinge section;

removing a portion of a second OEM hinge base region extending from the center console base member, leaving a second registration OEM hinge section;

obtaining a replacement hinge kit, the replacement hinge kit comprising:

a first replacement hinge member and a second replacement hinge member, said first replacement hinge member comprising a first replacement hinge base having a first registration receptacle formed as a recess extending inward from a lower surface thereof and a first replacement hinge pin extending outward from said first replacement hinge base, wherein said first replacement hinge pin is sized, shaped, and located to replicate a respective OEM hinge pin when assembled to the center console base member, and a second replacement hinge member comprising a second replacement hinge base having a second registration receptacle formed as a recess extending inward from a lower surface thereof and a second replacement hinge pin extending outward from said second replacement hinge base, wherein said second replacement hinge base is designed to engage with said first replacement hinge base, and wherein said second replacement hinge pin is sized, shaped, and located to replicate a respective OEM hinge pin when assembled to the center console base member;

inserting each said replacement hinge pin into a respective OEM hinge receptacle of said OEM armrest cover;

placing said first replacement hinge member onto said first registration OEM hinge section; and placing said second replacement hinge member onto said second registration OEM hinge section engaging said second replacement hinge base with said first replacement hinge base; and securing each said replacement hinge member to said center console base member.

14. A method for replacing a broken hinge for a center console as recited in claim 13, wherein the step of securing each said replacement hinge member to said center console base member further comprises inserting a threaded fastener through at least one said replacement hinge base and into said center console base member.

15. A method for replacing a broken hinge for a center console as recited in claim 14, further comprising a step of concealing a head of said threaded fastener into a countersink located at an exposed end of a fastener aperture.

16. A method for replacing a broken hinge for a center console as recited in claim 13, wherein the step of securing each said replacement hinge member to said center console base member further comprises inserting a threaded fastener through both replacement hinge bases and into said center console base member.

17. A method for replacing a broken hinge for a center console as recited in claim 16, further comprising a step of concealing a head of said threaded fastener into a countersink located at an exposed end of a fastener aperture.

18. A method for replacing a broken hinge for a center console as recited in claim 13, wherein the step of securing each said replacement hinge member to said center console base member further comprises a step of inserting a first threaded fastener through said first replacement hinge base and into said center console base member and a step of inserting a second threaded fastener through both said first replacement hinge base and said second replacement hinge base and into said center console base member.

19. A method for replacing a broken hinge for a center console as recited in claim 13, wherein each registration receptacle is shaped to contour to at least a portion of each respective registration OEM hinge section; and said step of placing each said replacement hinge member onto each respective said registration OEM hinge section further locates each said replacement hinge pin at an original hinge pin location.

20. A method for replacing a broken hinge for a center console as recited in claim 13, wherein the step of removing a portion of a damaged OEM hinge base region extending from the center console base member is accomplished using at least one of the following processes:

a) cutting,
    b) milling,
    c) abrading, and
    d) grinding.

\* \* \* \* \*